United States Patent [19]

Chang

[11] 4,180,326
[45] Dec. 25, 1979

[54] ANGLE MEASURING APPARATUS

[75] Inventor: Andrew K. Chang, Malibu, Calif.

[73] Assignee: FMC Corporation, San Jose, Calif.

[21] Appl. No.: 834,636

[22] Filed: Sep. 19, 1977

[51] Int. Cl.$^2$ ............................................. G01B 11/26
[52] U.S. Cl. ................................. 356/152; 250/578;
356/155
[58] Field of Search ................. 356/1, 141, 152, 172,
356/155; 250/552, 553, 578

[56] References Cited

U.S. PATENT DOCUMENTS

| | | | |
|---|---|---|---|
| 3,533,699 | 10/1970 | Hopkins et al. | 356/155 |
| 3,630,623 | 12/1971 | Schirmer | 356/155 |
| 3,781,111 | 12/1973 | Fletcher et al. | 356/152 |
| 3,781,115 | 12/1973 | Rader et al. | 356/172 |
| 3,782,831 | 1/1974 | Senften | 356/152 |
| 3,804,526 | 4/1974 | McKenney | 356/155 |
| 3,822,944 | 7/1974 | Hopkins et al. | 356/152 |
| 3,846,026 | 11/1974 | Waters | 356/141 |
| 3,865,492 | 2/1975 | Butler | 356/152 |
| 3,888,592 | 6/1975 | Geul | 356/155 |
| 3,953,134 | 4/1976 | Appel et al. | 356/155 |

FOREIGN PATENT DOCUMENTS

862590  3/1961  United Kingdom ..................... 356/152

Primary Examiner—S. C. Buczinski
Attorney, Agent, or Firm—Robert S. Kelly; John F. Verhoeven

[57] ABSTRACT

An apparatus and method for measuring the angle between two members is disclosed. A wheel aligner has a projector mounted on each front wheel of the vehicle to project a beam toward the other projector. Each projector has a detector to sense the presence of a beam from the opposite projector. Each projector has a plurality of light sources to project a plurality of beams, one at a time, in a diverging pattern. Circuitry is provided to identify the beam which is detected, at any angle of toe of the wheel, to thereby give the angle of toe.

18 Claims, 14 Drawing Figures

FIG_4

FIG_5

FIG_6

FIG_9

FIG_10

FIG_14

ANGLE MEASURING APPARATUS

BACKGROUND OF THE INVENTION

1. Field of the Invention

The present invention relates to an apparatus and method for measuring the angle between two members, such as in measuring the toe angle of a vehicle wheel. More particularly, the present invention relates to an instrument and method which provides a direct measurement of the angle between two members to give a reading without reliance on the measurement of other parameters.

2. Description of the Prior Art

One method used in adjusting the toe angle of the front wheels of a vehicle is based on deriving the toe angle from a known distance to a screen and a given displacement of a projected beam on the screen, as shown, for example, in U.S. Pat. No. 3,953,134. A more direct method of measuring the toe angle utilizes the projection of a scale to a target screen which has a reference line thereon. In a system of this type, the distance of the screen from the projector (which is mounted on the wheel) is not critical because the image will be larger on a more remote screen and smaller on a near screen. In other words, although the spacing between two indicia on the scale changes with distance of the scale from the projector, the angle formed by lines extending from the projector to the indicia does not change. The movement of the projector beam, due to adjustment of the toe of the wheel, from one indicia to the other, will be a movement through the same angle regardless of the precise distance of the projector to the screen.

The problem with scales on screens, whether projected or not, stems from the difficulty of reading the scale accurately. Frequently, the operator is a considerable distance from the screen, and ambient light makes the task more difficult. It is therefore generally preferable to employ an electronic readout of the projected beam and target. Some electronic toe reading apparatus, such as shown in U.S. Pat. No. 3,865,492, uses a fixed target, as distinguished from a projected target, and the electronic readout must be calibrated in accordance with the distance between the projector and the target.

Another system employing an electronic readout of wheel toe is shown in the U.S. Pat. No. 3,782,831. In this system, a unit which is mounted to the wheel to be measured has a projector thereon. The projector is swung back and forth to sweep a beam across a detector which is spaced from the unit. An instantaneous analog voltage is developed during the sweep of the projector which is proportional to the angle of the beam at any given instant. When the beam strikes the detector, a readout is obtained which gives the toe of the wheel on which the unit is mounted.

SUMMARY OF THE INVENTION

In the present invention direct angle measurement between two members, such as between the wheels of a vehicle, is obtained electronically, but without any mechanical sweeping of a projector or other mechanical member.

In one form of the invention, a plurality of light sources, or sources of energy beams, are mounted in fixed relation to one member to cast beams in a diverging pattern to an opposite member on which a detector is mounted in fixed relation. On sequential energization of the light sources, one, or several adjacent, light sources will strike the detector to indicate the angle between the members.

In the preferred form of the invention, a projector member is mountable in fixed relation to the plane of a wheel of the vehicle for angular orientation (when the steering apparatus is stationary) in accordance with the toe of the vehicle wheel and for angular displacement (with the steering apparatus still stationary) in accordance with a change in the toe of the wheel. A plurality of light sources are mounted in the member and each is operable when energized to project a light beam. The sources are arranged in the member to project the beams in a diverging pattern and in predetermined angular relation. A photosensitive detector is operable to generate a signal when struck by any one of said beams. When the wheel of the vehicle is turned straight ahead and the wheel has zero toe, a reference line extending from the member intersects the detector. When, thereafter, the member is mounted, in the same fashion, on the wheel of a vehicle with unknown toe, the sources are energized one at a time (to project the beams one at a time) until the detector is struck by the beam. The angle between the center of the beams which strike the detector and the reference line will be the angle of toe, and means are provided to give an indication of this angle electronically. The sequential energization of the light sources continues, and as the toe of the wheel is changed by the operator in adjusting the toe, beams from different light sources will strike the detector. The toe indicator electronically gives the current toe reading of the wheel to permit the operator to get the desired toe angle.

It is therefore one object of the present invention to provide an improved apparatus and method for measuring the angle directly between two members.

It is another object of the present invention to provide an electronic toe indicating mechanism which senses the angle of toe directly.

It is yet another object of the present invention to provide an electronic toe indicating mechanism which can sense the angle of toe without moving members or swinging elements.

DESCRIPTION OF THE PREFERRED EMBODIMENT

Figure 1:
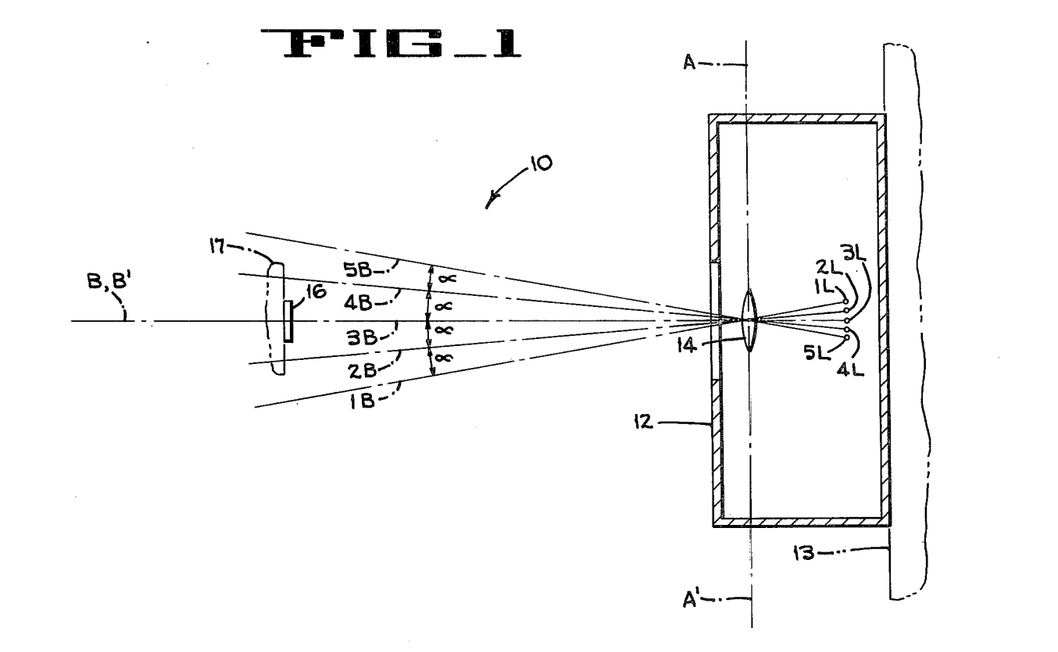
FIG. 1 is a plan view of a toe indicating apparatus constructed in accordance with the present invention.

There is shown in FIG. 1, in plan, a schematic representation of angle measuring apparatus 10 constructed in accordance with the present invention. A body member 12 is secured on one member 13 by mounting means (not shown). A longitudinal axis A through the body member 12 is coincident with an axis A' in space when the body member 12 is oriented as in FIG. 1. A transverse axis B through the body member 12 is coincident with an axis B' in space (when the body member 12 is oriented as in FIG. 1) and is perpendicular to axis A. It is only necessary that the body member 12 be fixed relative to the member 13 and in some fixed predetermined angular relation to the member 13.

A plurality of energy, or light, sources 1L, 2L, 3L, 4L and 5L are mounted in the body member and each projects a beam through lens 14 to form a diverging pattern of beams (1B, 2B, 3B, 4B and 5B, respectively) which are projected from the body member 12 in predetermined angular relation. The beams are shown as diverging with respect to each other at angles $\alpha$.

The transverse axis B (which, like axis A, is fixed with respect to member 12) may be considered a reference line. One of the light sources (as, for example, source 3L) may be positioned to project a beam 3B along line B.

A photosensitive detector 16 is mounted (by means not shown) on body 17 which is in spaced relation to the member 13. When the member 13 is at some predetermined orientation (which results in the body member 12 being in the predetermined position shown) designated as a reference position for convenience, the reference line B will intersect the detector 16 and the beam 3B will strike the detector 16. In other words, the angle measuring device is arranged so that when it is mounted on member 13, the detector 16 will be intersected by the reference line B and struck by the reference beam 3B when the member 13 is at a reference position. All angle readings are given with respect to the reference position, which is considered as the zero angle position with respect to member 17.

Figure 2:
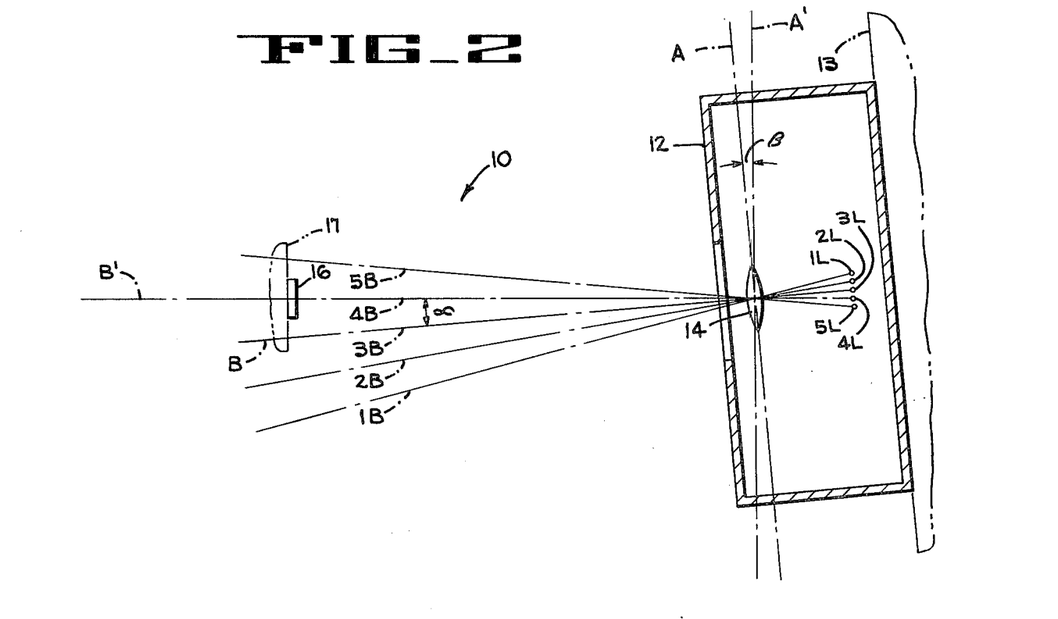
FIG. 2 is a view similar to the view of FIG. 1 except with a different relative orientation between portions of the apparatus.

When the angle measuring device 10 is mounted on a member 13 of unknown angle relative to member 17, as shown in FIG. 2, the body 12 is cocked at some angle $\beta$ with respect to its zero angle position (FIG. 1). In order to determine the value of the unknown angle $\beta$, the light sources are energized, one at a time, until a beam from one of the sources strikes the detector. When the light source from which the beam is emitted is identified (light source 4L in FIG. 2) the angle with respect to the zero angle will be known since it is the same ($\alpha$) as the angle between the reference line B and the beam (4B) which strikes the detector. This angle is known since the light sources are arranged to project beams in a diverging pattern and in a predetermined angular relation.

Figure 3:
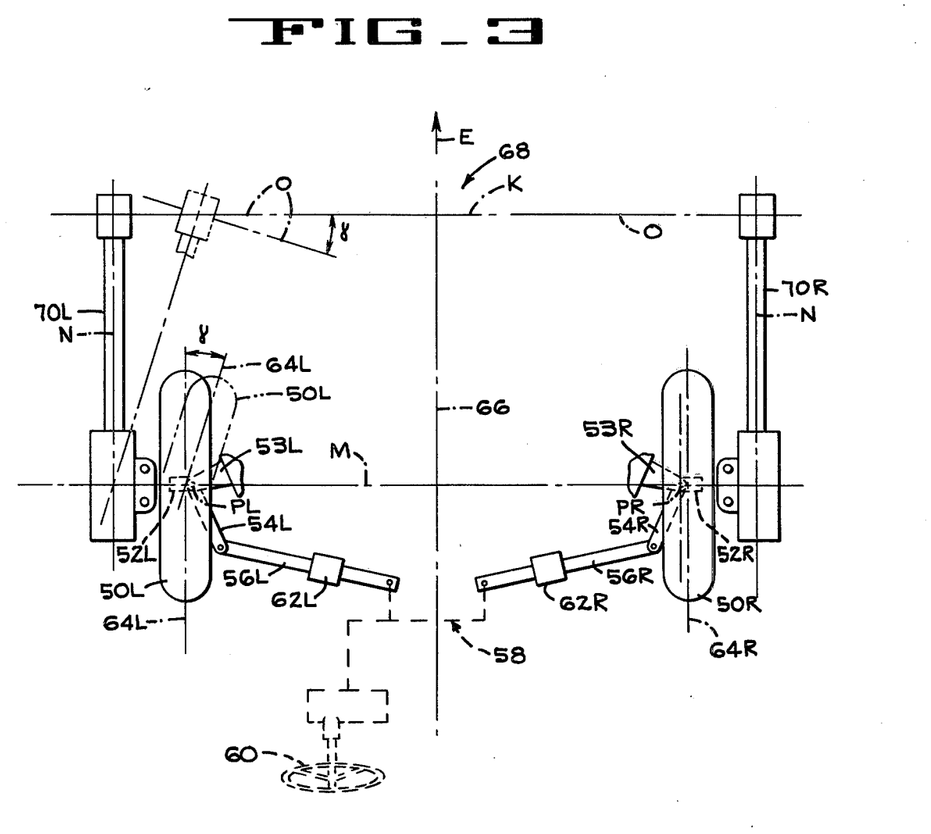
FIG. 3 is a view plan of a preferred form of toe indicating apparatus constructed in accordance with the present invention as mounted on the front wheels of a vehicle.

There is shown in FIG. 3 the preferred embodiment of the present invention wherein the toe angle of each of the front wheels of a vehicle is measured.

Toe has been defined as the difference in distance between the extreme front and the extreme rear of the tires of a vehicle at spindle height. The toe angle of a front wheel can be defined as the angle that wheel makes to the longitudinal centerline of the vehicles when viewed from above. Total toe angle is the angle the plane of one wheel makes with the plane of the other wheel, measured in a horizontal plane. This total toe angle is equal to the algebraic sum (where toe-in is considered positive on each wheel and toe-out is considered negative) of the angles the planes of the wheels make with the longitudinal centerline of the vehicle. Toe-in is the condition which exists when the front of the two front wheels are closer together than the rear of the front wheels and toe-out is the condition which exists when the front of the two front wheels are farther apart than the rear of the front wheels.

FIG. 3, which is in plan, shows a schematic view of the front end of a conventional vehicle (with arrow E pointing toward the front). The vehicle mechanism will be described only to the extent deemed necessary for a better understanding of toe measuring system shown in FIG. 3. The left front wheel 50L, and the right front wheel 50R, are mounted on wheel spindles 52L and 52R, respectively. The spindles are pivotally secured to members 53L, 53R mounted on the vehicle frame, for angular movement about pivot axes PL and PR. A steering arm 54L, 54R is rigidly attached to each spindle for turning movement therewith about pivot axes PL, PR. Tie rods 56L, 56R are pivotally connected, respectively, at one end to the ends of the steering arms. The opposite ends of the tie rods are connected to the steering mechanism 58 which is operated by the vehicle steering wheel 60. The adjustment of turnbuckles 62L, 62R on the tie rods (which shorten or lengthen the tie rods) will swing the wheels about the pivot axes PL, PR to change the toe of the wheel since the inner ends of the tie rods are substantially anchored by the steering mechanism. The toe of the wheels 50L and 50R will each be zero when the central planes 64L, 64R thereof are parallel to a central longitudinal reference plane 66 through the vehicle.

Toe indicating apparatus 68 includes a lefthand projector 70L, mounted on the left wheel 50L, and a righthand projector 70R, mounted on the right wheel 50R. Since the projectors 70L and 70R are identical, except that they are of opposite hand, only the lefthand projector 70L will be described in detail.

Figure 4:
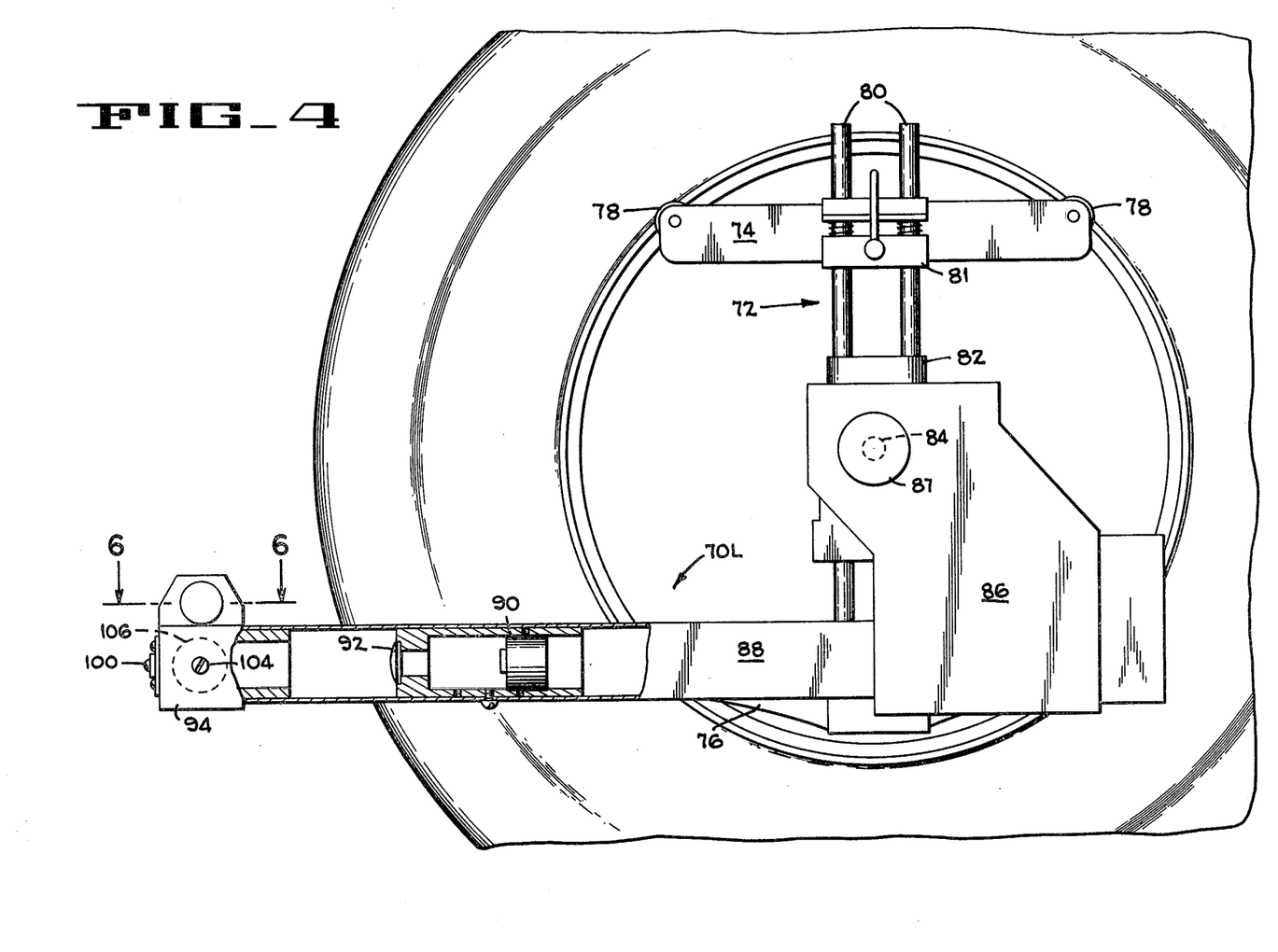
FIG. 4 is a side elevational view of the apparatus of FIG. 3.
Figures 5, 6:
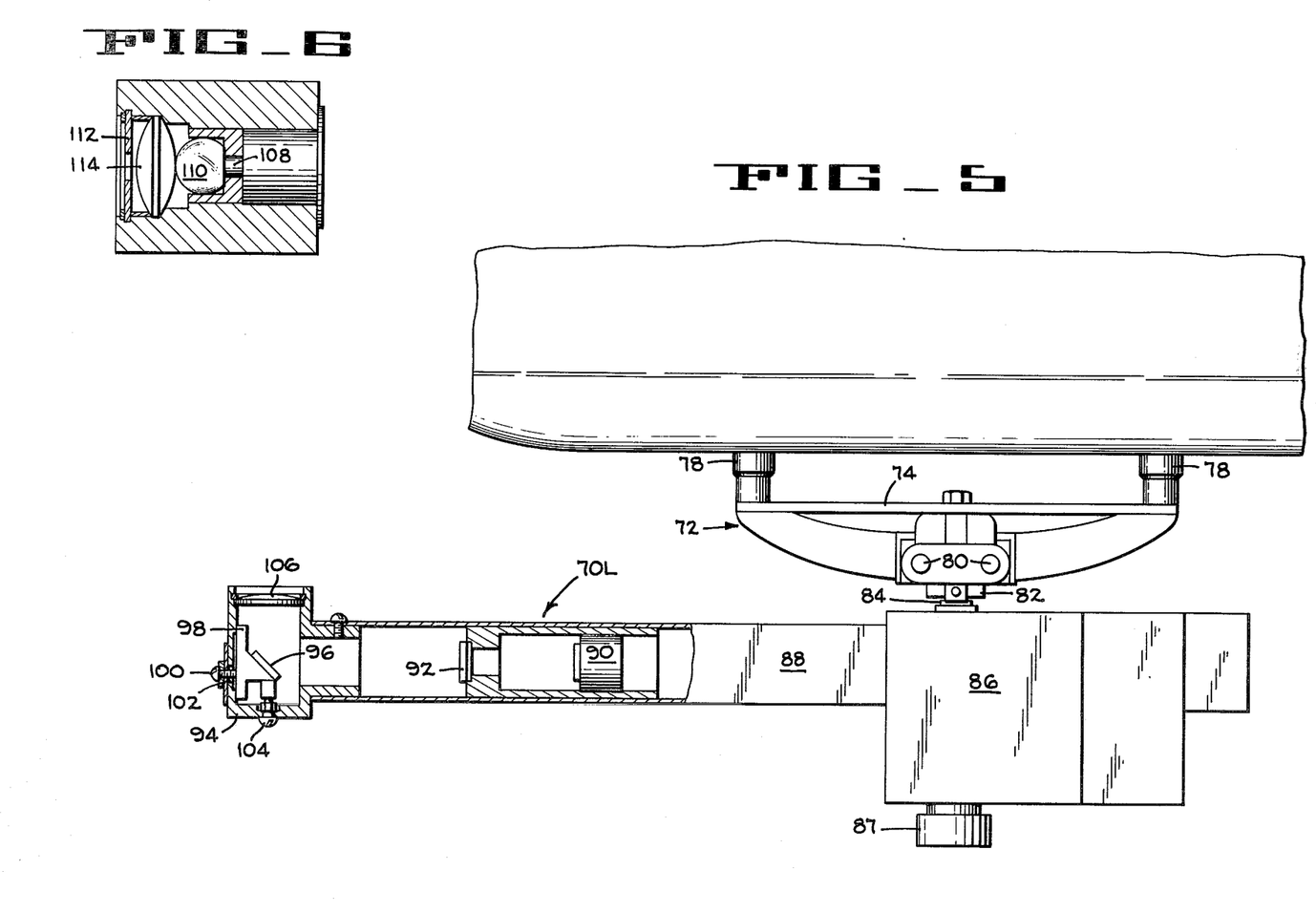
FIG. 5 is a fragmentary plan view of the apparatus of FIG. 3.
FIG. 6 is a view taken on the lines 6—6 of FIG. 4.

The wheel mounted support mechanism 72 for mounting the projector to the wheel is shown in FIGS. 4 and 5. This mechanism is of the type shown in the U.S. Pat. No. 3,709,451 of Graham and includes cross bars 74, 76 each with teeth 78 to grip the rim of the wheel. Parallel rods 80 are clamped in the cross bars by clamp 81 and support a block 82 with an outwardly extending shaft 84 aligned with the center of the wheel. The shaft 84 is journaled in the base 86 of the projector, and has a knob 87 thereon which can be tightened to secure the projector to the wheel. Tightly received in the base 86 of the projector 70L is a barrel 88. Enclosed in the barrel 88 is a light-emitting diode (or LED) array 90 which constitutes a plurality of light sources to project a plurality of light beams. A cylindrical lens 92 is mounted in the barrel in front of the LED display.

As shown best in FIG. 5, the barrel 88 has a head 94 thereon with a mirror 96 mounted therein in the path of the beams projected from the LED array 90. The mirror, which is oriented at a 45° angle to the path of the beams, is mounted on a base 98. The base 98 is slidably received on the front of the head 94 and can be clamped thereon by a screw 100 received in the base through a slot 102. The base and mirror can be moved laterally with respect to the path of the beams by a screw 104 journalled in the head and threadedly received in the base 98.

The mirror 96 deflects the beams of light from the LED array through a 90° angle for passage through a lens 106 in the head. The light beams are thus focused by lens 106 and directed toward the head 94 of the righthand projector.

A spherical lens 114 (FIG. 6) is mounted in the head above lens 106 to receive the light beams from the righthand projector. A mask 112 (see projector 70R, FIG. 8) with a vertical slit aperture equal in width to a single light beam is mounted in front of lens 114. A hyper-hemispheric lens 110 is mounted behind lens 114 to concentrate the received light, and detector 108 is mounted on the flat face of lens 110 to absorb the concentrated light.

The geometry of a preferred system can best be understood with reference to the schematic representation of FIG. 3. A line M is an axis between the center of the front wheels 50L and 50R (when the wheels are aimed straight ahead) and perpendicular to plane 66. Lines N are axes through the projector which will be perpendicular to axis M when the wheels are aimed straight ahead and the wheels have zero toe. Lines O are two lines each emanating from the heads of the projectors perpendicular to the lines N, and these lines will be coincident to a line in space K (which is always parallel to line M) when the wheels are aimed straight ahead and have zero toe. The lines O can be considered to be reference lines (coincident with a reference beam) from the right and left projector.

As previously noted, when the toe angles of both wheels 50L and 50R are zero, and the wheels are aimed straight ahead, the lines O (which are always perpendicular to the lines N) will be parallel to the line M and coincident to the line K. When one or both of the wheels are at some other toe angle (as wheel 50L shown in dotted lines in FIG. 3), the reference line O will swing away from line K through the same angle $\gamma$ as the plane 64L of the wheel 50L makes with the plane 66 (which angle is the toe angle of the wheel).

The detector 108 of the projector on the opposite right wheel remains substantially on the line K at different angles of toe of the right wheel 50R, and the beam of some other light source of projector 70L (other than the reference beam) will travel substantially on line K when the toe of the left wheel is other than zero, to strike the detector. Thus, the angle $\gamma$ between the light beam which strikes the detector, and the reference line O (which is the line a beam travels to strike the detector when the toe angle is zero) is equal to the angle $\gamma$ between the plane of the wheel at zero toe (which is parallel to plane 66) and the plane of the wheel as shown in dotted lines (which angle is the toe angle of the wheel).

Figure 7:
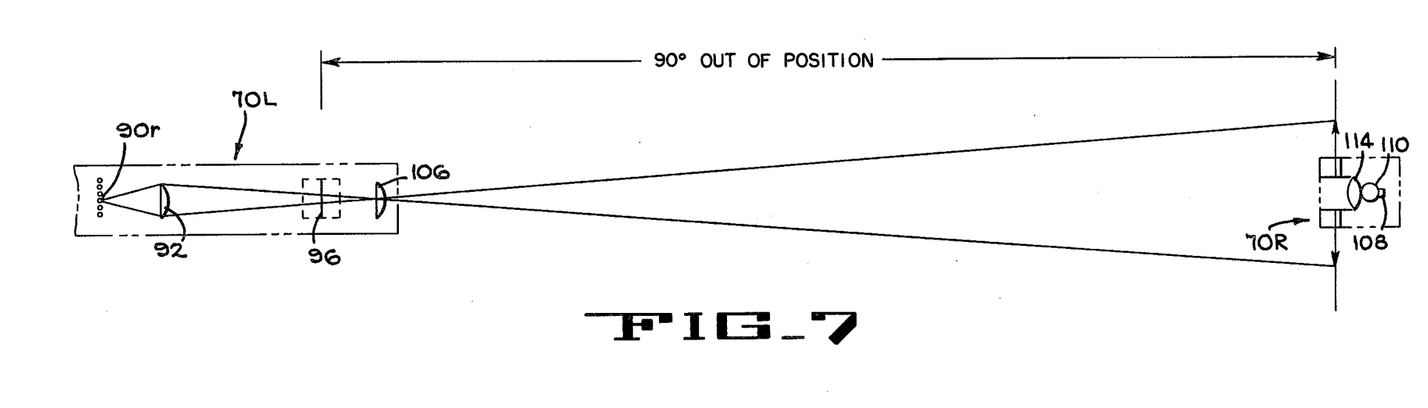
FIG. 7 is a schematic diagram, in elevation, of the optics of the apparatus of FIG. 3.
Figure 8:
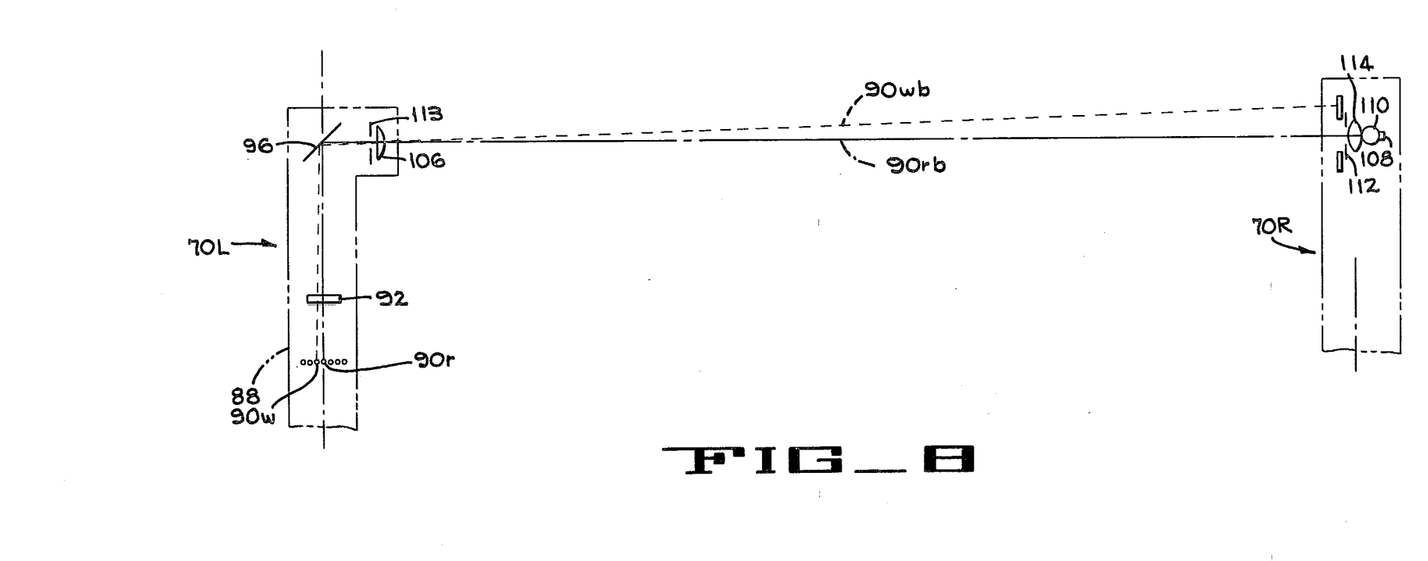
FIG. 8 is a schematic diagram, in plan, of the optics of the apparatus of FIG. 3.

The optics of each projector are shown schematically in FIGS. 7 and 8. For purposes of illustration, it is assumed that the instantaneous light source is a diode 90r (since only one light beam is projected at a time), and that diode projects light to the cylindrical lens 92. As viewed in elevation (FIG. 7), the beam is condensed by lens 92 and directed toward the mirror 96. The mirror deflects the beam 90° out of the plane of the paper, so the beam is shown 90° out of position for clarity. The beam from light source 90r then strikes the projection lens 106 which projects the beam toward the detector 108 in the righthand projector 70R.

When the image reaches the righthand projector it has a large vertical span, only a small portion of which enters the head of the projector to strike spherical lens 114. This lens condenses the light to strike the lens 110, which, in turn, gathers the light for the detector 108.

As viewed in plan (FIG. 8), the beam 90rb from the energized light source 90r passes through the cylindrical lens 92 and strikes mirror 96. The beam is deflected through 90° from mirror 96 and a portion of it passes through a narrow vertical slit aperture defined by masks 113 to projection lens 106. Since only a very narrow beam of light strikes lens 106, the focused beam remains narrow as it passes to the righthand projector to strike spherical lens 114 unaffected by the projection distance which varies according to the size of the vehicle being serviced.

When another light source, such as light source 90w, is energized (at which time all other light sources, including light source 90r, is deenergized), the beam 90wb passes through cylindrical lens 92 to strike mirror 96. The beam is deflected through an angle of 90° by mirror 96 to lens 106. However, because of the particular angle of the wheel, the beam 90wb does not strike the detector 108 of the projector unit 70R.

FIGS. 7 and 8 show only the light projecting means (LED 90, lens 92, mirror 96 and lens 106) of projector 70L and only the light receiving means (lens 114, lens 110 and detector 108) of projector 70R. It should be noted that each projector 70L and 70R has both the light projecting means and the light receiving means. Consequently, the light receiving means of projector 70L acts as the target for the light projecting means of projector 70R, and the light receiving means of projector 70R acts as the target for the light projecting means of projector 70L.

With reference to FIG. 7, the beam from only one light source has been indicated since only one light source is energized at one time, although two beams have been illustrated in FIG. 8. Although it is convenient, for purposes of explanation, to imagine that, at any given angle of toe, one, and only one, light source will strike the detector, this is not the fact. Actually, several light sources (say, two, three or four) will strike the detector at any given angle of toe. As described more fully hereinafter, if an odd number of light beams strike the detector, the center beam will determine the toe angle; if an even number of light beams strike the detector, a point midway between the two center lights will determine the toe angle. If in the discussion herein, a single light source is referred to in conjunction with the toe angle, it will be understood that the center light source, or an imaginary light source midway between the two center light sources, is referred to.

The light source 90r of projector 70L is the light source which will strike detector 108 of projector 70R when the toe of wheel 50L is zero. Conversely, there is a light source in projector 70R (corresponding to the light source 90r in projector 70L) which will strike the detector 108 of projector 70L when the toe of the wheel 50R is zero.

When the wheel 50L is toed in or out, a different light source from projector 70L will strike the detector 108 of projector 70R (which particular source will depend on the amount of toe in or toe out of the wheel 50L). Similarly, when the wheel 50R is toed in or out, a different light source from projector 70R will strike the detector 108 of projector 70L, the particular light source depending on the extent of the toe in or toe out. Thus, the identification of the light source of a particular projector which is striking the detector 108 of the other projector will reveal the angle of toe of the wheel to which the projector is attached.

When the LEDs are turned on and then turned off in sequence, one at a time, a series of light beams strike the opposite projector, at least one of which will strike the opposite detector 108 at a given toe angle of the wheel on which the projector is mounted. Since the beams are projected in a diverging pattern, each projected beam is at a unique angle to the plane of the wheel. Thus, when an electronic circuit is connected to the light-sensitive cell 108 and to each of the LEDs 90a to 90n, signals developed by the light-sensitive cell and by the LEDs can be used to ascertain the angular position of the wheel on which the sequentially energized LEDs are mounted.

Figure 9:
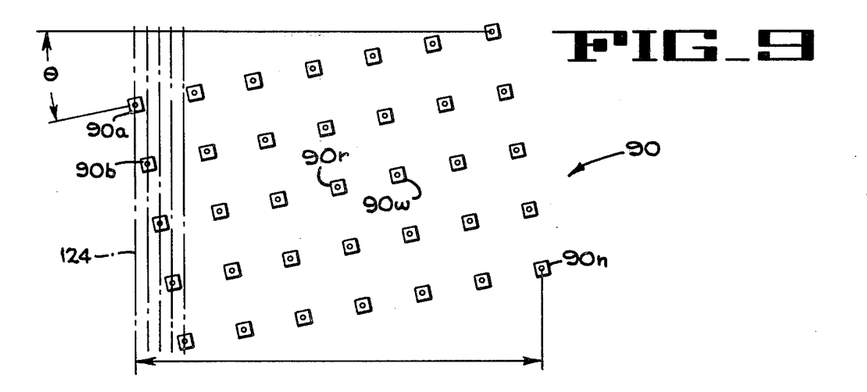
FIG. 9 is a schematic diagram of an array of light sources utilized in the present invention.
Figure 10:
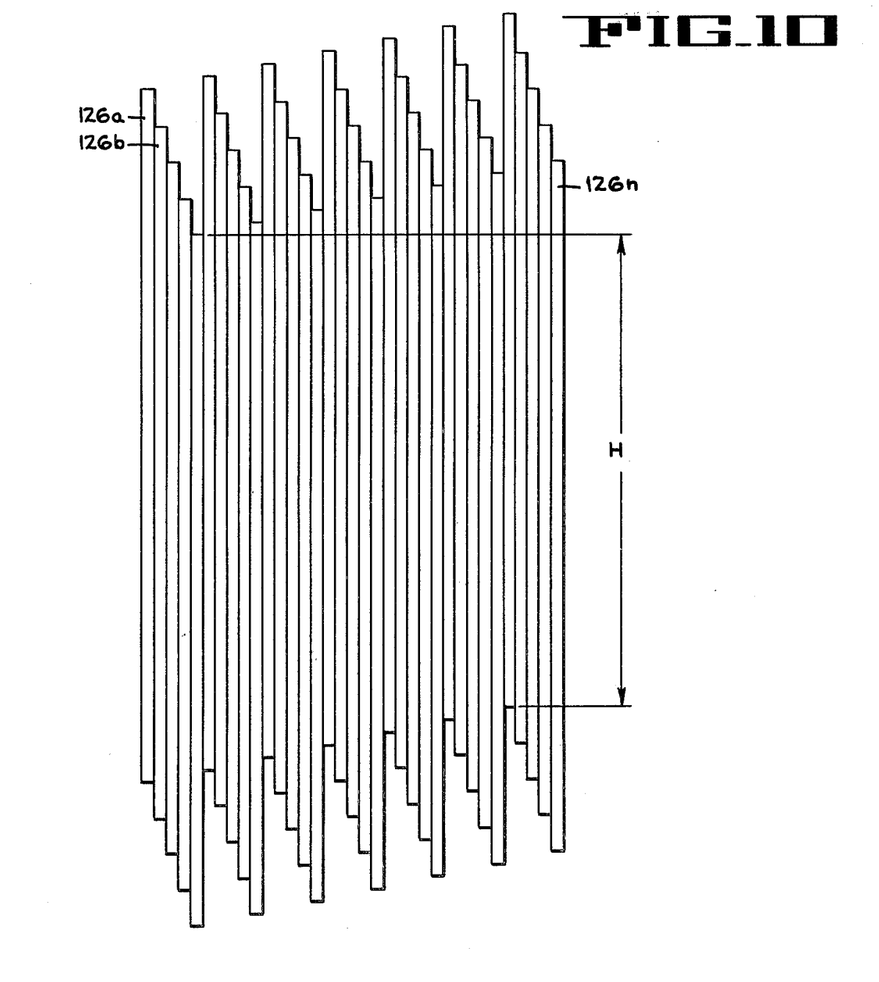
FIG. 10 is a schematic diagram of the beams projected from the array of FIG. 9.

It was shown in FIGS. 7 and 8 how each LED projects a tall, narrow bar of light. There is shown in FIG. 9, a commercially available array of LEDs in which the individual LEDs are spaced apart (for convenience of manufacture) in a rectangular matrix. When this matrix is rotated by an angle $\theta$ (FIG. 9) in relation to cylindrical lens 92 (FIG. 7) it projects vertically oriented light bars (see FIG. 10) which are closely spaced for sensitive toe measurement. Other arrays of LEDs to produce with an appropriate lens a series of diverging beams can be used, as shown in FIGS. 1 and 2. The rotation of a rectangular array, of itself, does not form a part of the present invention. The vertical dotted lines through each LED in FIG. 9 represents a center-line 124 for a particular bar of light 126a to 126n. The vertical dimension H (FIG. 10) represents the usable height of the entire field of projected light beams.

Figure 11:
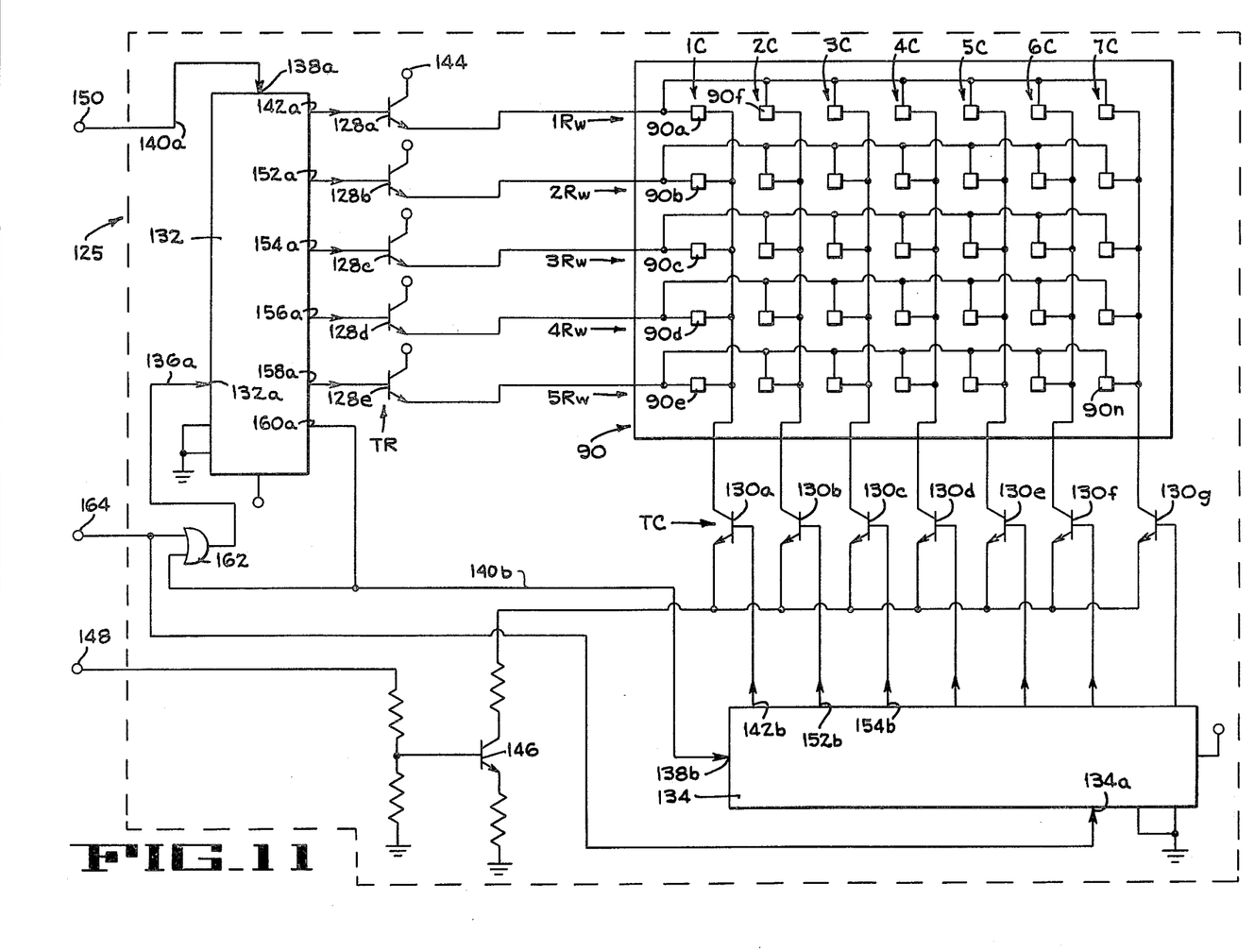
FIG. 11 is a schematic electrical diagram of the circuit by which the light sources are energized sequentially.

A circuit 125 which will energize each of the light-emitting diodes 90a–90n in sequence, one at a time, is shown in FIG. 11. Although the circuit illustrated operates to energize the light-emitting diodes in an order corresponding to the positions of the light bars, the diodes may be energized in a random sequence instead. The LED array 90 is shown, and includes a total of 35 light-emitting elements arranged in five rows (1Rw, 2Rw, 3Rw, 4Rw, and 5Rw) and in seven columns (1C, 2C, 3C, 4C, 5C, 6C and 7C). Five transistors 128a, 128b, 128c, 128d and 128e (comprising a group TR) control the energization of the five rows 1Rw to 5Rw of LEDs respectively; seven transistors 130a, 130b, 130c, 130d, 130e, 130f and 130g (comprising a group TC) control the energization of the seven columns 1C to 7C respectively. During the operation of the circuit (as will be more fully discussed hereafter), two transistors and only two transistors (one from each of the groups TR and TC) are in a state to pass current at any instant to energize one LED, and only that one LED. All of the other transistors or groups TR and TC are in a state to block current so that no other LED will be energized at that particular instant.

To achieve that result, two counters 132, 134 are provided. The two counters 132 and 134 each have a reset input terminal (132a, 134a) which receive pulses periodically through lines 136a, 136b respectively. Each counter also has a step input terminal (138a, 138b) which receives pulses periodically through lines 140a, 140b. After a pulse has been received at reset terminals 132a, 134a (which resets the counters to begin a cycle), a voltage will appear on a first output terminal 142a, 142b, respectively, of the counters. These voltages will close the switches defined by transistors 128a, 130a so that a current will flow from voltage source 144 through switch 128a, through LED 90a, through switch 130a, and through switch 146 (if that switch is closed) to ground. The current will energize LED 90a, and only LED 90a, to cast a beam 126a (FIG. 10) from the projector mounted on one wheel to the detector mounted on the opposite wheel.

The switch defined by transistor 146 is turned on and off at a high frequency (say, 15 kilohertz) by a high frequency pulse from terminal 148. Thus, the light from LED 90a is intermittent, and filtering means can be provided to block out spurious signals from ambient light for a better detection of the high frequency light source.

At the next pulse from terminal 150 through line 140a to step input terminal 138a (which follow the initial pulse by, say, 3 milliseconds), voltage is removed from terminal 142a of counter 132 and shifted to terminal 152a. The voltage at terminal 142b of counter 134 remains. Thus, LED 90b, and only LED 90b, is energized to project a high frequency light beam. Subsequent pulses at terminal 138a shift the voltage in counter 132 sequentially to terminals 154a, 156a and 158a to project beams sequentially from light sources 90c, 90d and 90e.

The next pulse at terminal 138a shifts the voltage to terminal 160a of counter 132 so that a voltage appears at an input terminal of OR circuit 162 to transfer a signal through line 136a to reset terminal 132a of counter 132. Thus, voltage is again produced at terminal 142a of that counter. Simultaneously, the signal from terminal 160a is impressed on the step input terminal 138b of counter 134 to step the voltage from the first terminal 142b to the next terminal 152b. Consequently, the first light source 90f in the next column is energized. As pulses continue to be impressed periodically on terminal 150, the two counters step in synchronization, with one counter 132 sequentially applying a voltage to the leads to each row, while the other counter 134 sequentially applies a voltage to the leads to each column (after all the lights of the previous column have been energized). An examination of FIGS. 9 and 10 will indicate that the light bars are sequentially energized, one at a time, from left to right.

After a time interval sufficient for completion of the sequential energization of all the light emitting diodes, a signal is impressed on terminal 164 to reset both the counter 132 (by a signal at reset terminal 132a) and counter 134 (by a signal at reset terminal 134a). Thereafter, the entire array will again be sequentially energized, one at a time. The counters may be the commercially available counter CD 4022.

Figure 12:
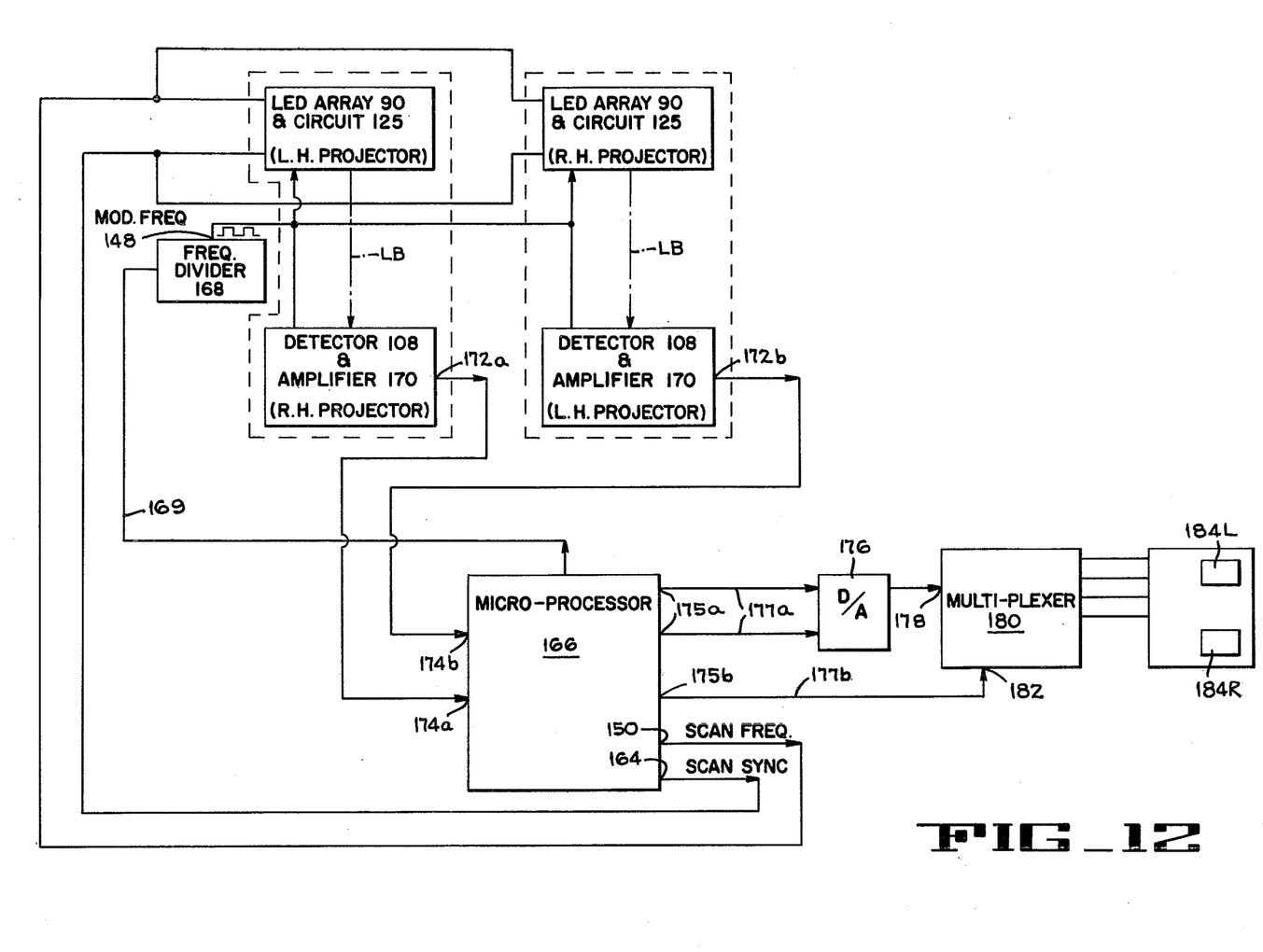
FIG. 12 is a schematic diagram of one system for operation of the apparatus of FIG. 3.

The scan clock pulses (terminal 150), scan sync pulses (terminal 164), and modulation frequency pulses (terminal 148) are developed by a microprocessor 166 and a frequency divider 168, as shown in FIG. 12. The frequency divider is connected by line 169 to the microprocessor to receive high frequency pulses therefrom.

When the modulated light from one of the LEDs of the array 90 in the lefthand projector 70L falls on the detector 108 of the righthand projector 70R, the detector produces a modulated signal which is amplified by an amplifier 170 and applied from output terminal 172a to an input terminal 174a of the microprocessor 166. The amplifier 170 may include a resonant circuit which is tuned to the modulation frequency to reduce the effects of any ambient light which may also be received by the light-sensitive detector 108. The signal from the amplifier terminal 172a (which appears when a beam of light strikes the detector), and the scan signals developed by the microprocessor and frequency divider (at terminals 150, 164, 148), are used to determine which of the LEDs of the lefthand projector provided light to the light-sensitive detector of the righthand projector, and to determine the angle of toe of the left front wheel of the vehicle being checked. A similar arrangement (including the LED array of the righthand projector 70R, and the detector 108 and amplifier for the lefthand projector) produces a signal at output terminal 172b which is transmitted to terminal 174b of the microprocessor for determining the angle of toe of the right front wheel.

These target signals received at terminals 174a and 174b are processed by the microprocessor and used to generate digital toe signals which are impressed on terminals 175a. These terminals are coupled to a digital-to-analog converter 176 by an eight line input-output bus 177a. The converter converts the digital signals to analog toe signals which are coupled to the signal input terminal 178 of the multiplexer 180. At this same time, the microprocessor develops control signals at terminals 175b which are coupled by a three line channel selector 177b to the control lead 182 of the multiplexer.

The toe signals and control signals cause the multiplexer 180 to provide display signals to a display unit 184L, 184R which displays the value of toe for the wheels of the vehicle. The display unit may include two meters which are directly calibrated to read the angle of toe of the wheels of the vehicle. One of the meters 184L reads the angle of toe to the left front wheel, and a second meter 184R reads the toe of the right front wheel. A multiplexer which may be used is the 34051 manufactured by Fairchild Semiconductor. A microprocessor 166 which may be used to control the logic circuitry of FIG. 12 is the F-8 manufactured by Fairchild Semiconductor, Mountain View, California.

Figure 14:
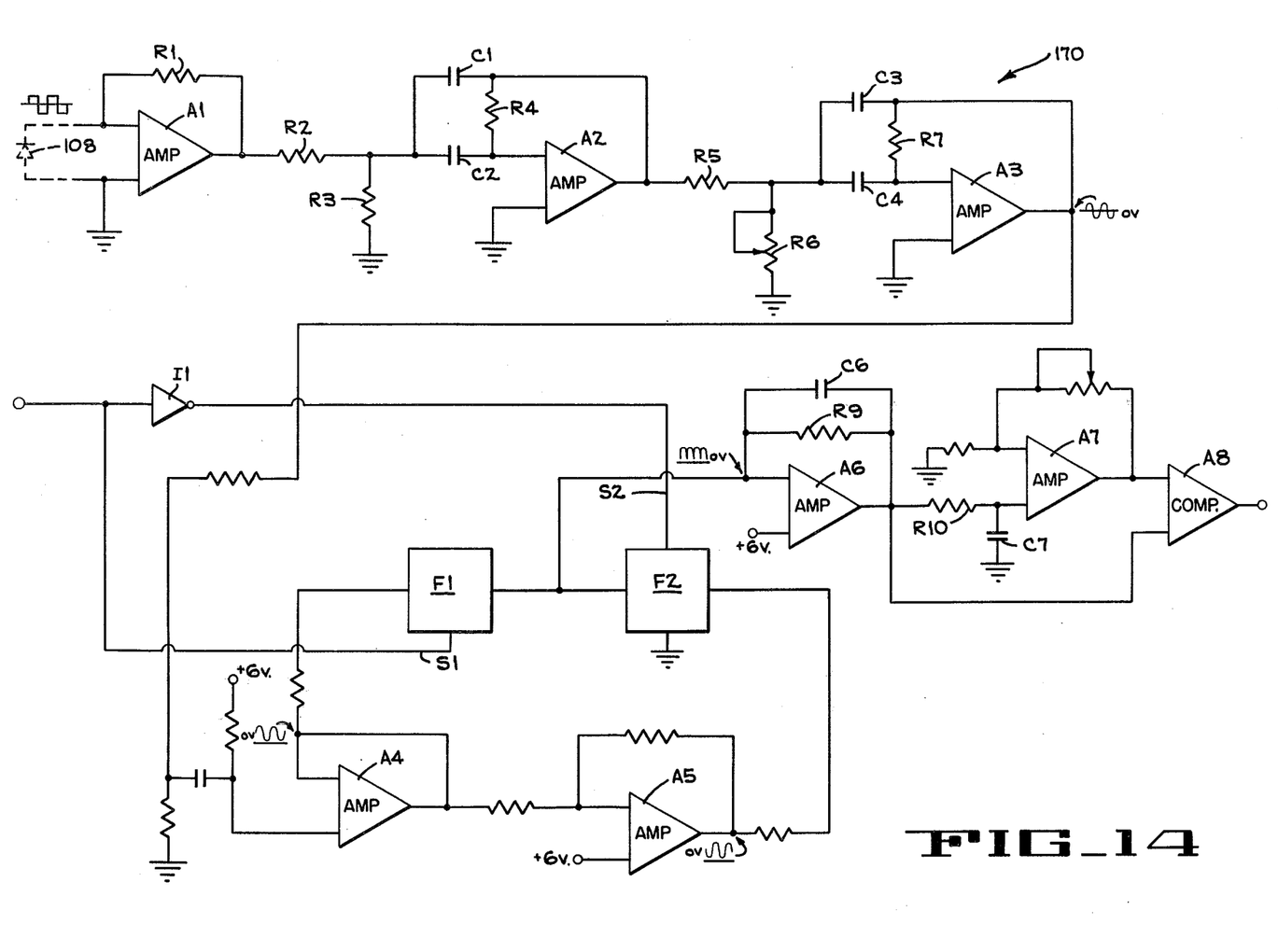
FIG. 14 is a schematic diagram of the detector and amplifier circuit.

The detector 108 and amplifier circuit 170 which may be used in the present invention are disclosed in FIG. 14. The circuit includes the photodiode 108, a plurality of amplifiers A1-A7, a pair of field effect transistor (FET) switches F1, F2 and a voltage comparator A8. The photodiode 108 is connected directly across the input leads of the amplifier A1 which provide a low impedance due to the feedback resistor R1 that is connected between the negative input lead of the amplifier A1 and the output lead of the amplifier A1. The low impedance causes the diode 108 to provide a current output which is directly proportional to the amount of light falling on the photodiode. This current is applied to the input leads of the amplifier A1 which converts a linear change in current to a linear change in voltage.

The modulated light beam LB (FIG. 12) from the LED array 90 causes the photodiode 108 (FIG. 14) to produce pulses of current which are represented by the waveform shown at the negative input lead of the amplifier A1. This current is amplified and converted to a similar waveform of voltage at the output lead of the amplifier A1. The output of the amplifier A1 is applied to a two-stage amplifier/filter which includes the amplifiers A2, A3 and the filter networks of R2, R3, R4, C1, C2 and R5, R6, R7, C3, C4. The amplifiers A2, A3 and the filter networks provide a narrow band-pass filter which allows the 15 kilohertz signal generated from the modulated light from the LEDs to pass through. Noise signals of other frequencies are attenuated by these filters to prevent possible errors in toe readings due to noise signals. The filters change the substantially square wave signal at the output lead of the amplifier A1 into a substantially sine wave signal at the output lead of the amplifier A3 by attenuation of the harmonics contained in the square wave.

The sine wave signal from the output lead of the amplifier A3 is further amplified and the reference level changed from zero volts to a +6 volts by the amplifier A4 and by the +6 volts bias at the positive amplifier input lead. The signal at the output lead of the amplifier A4 is inverted in phase by the inverter/amplifier A5 which also provides a signal reference level of +6 volts. The signals from the output leads of the amplifiers A4, A5 are coupled to the input leads of the FET switches F1 and F2 respectively.

The switches F1, F2 are opened and closed by the same modulation frequency pulses which are used to modulate the light from the LEDs. This modulation frequency is applied to a switch control lead S1 of the switch F1 and is inverted by an inverter I1 and applied to a switch control lead S2 of the switch F2 so that the signals at leads S1 and S2 are 180° out of phase. This causes the switches F1 and F2 to be opened and closed at a rate which is equal to and in phase with the signals from the output leads of the amplifiers A4 and A5, and causes the positive half of each cycle of signals from the amplifiers A4 and A5 to be gated to the input lead of the integrator amplifier A6. The input waveform is shown near the input lead of the integrator/amplifier A6 (FIG. 14). On the other hand, any noise voltage which does not have the same frequency and the same phase as the modulation frequency would have both negative and positive portions transmitted through the switches F1 and F2 resulting in cancellation of the noise.

The integrator/amplifier A6 is a conventional integrator having a resistor R9 and capacitor C6 connected between the input lead and the output lead. In the integrator R9, C6 the positive and negative portions of noise voltages cancel each other, while only the positive portions of the signals are transmitted through the switches F1 and F2 to the integrator. When the photodiode receives light signals, the resulting positive pulses from the output lead of the integrator/amplifier A6 causes the capacitor C7 to charge to the polarity shown in FIG. 14. The resulting voltage on the capacitor C7 is determined by the amplitude and the time duration of the signal at the output lead of the amplifier A6.

The voltage on the capacitor C7 causes the amplifier A7 to provide a corresponding bias voltage on the negative input lead of the voltage comparator A8. The input signal on the + input lead of the comparator A8 is compared to the bias voltage on the negative input lead with the comparator A8 providing a positive output signal whenever the input signal is greater than the bias voltage and providing an output signal having a value near zero whenever the input signal is less than the bias voltage. Any positive output signal from the amplifier A8 is transmitted to terminals 172a or 172b (FIG. 12).

Figure 13:
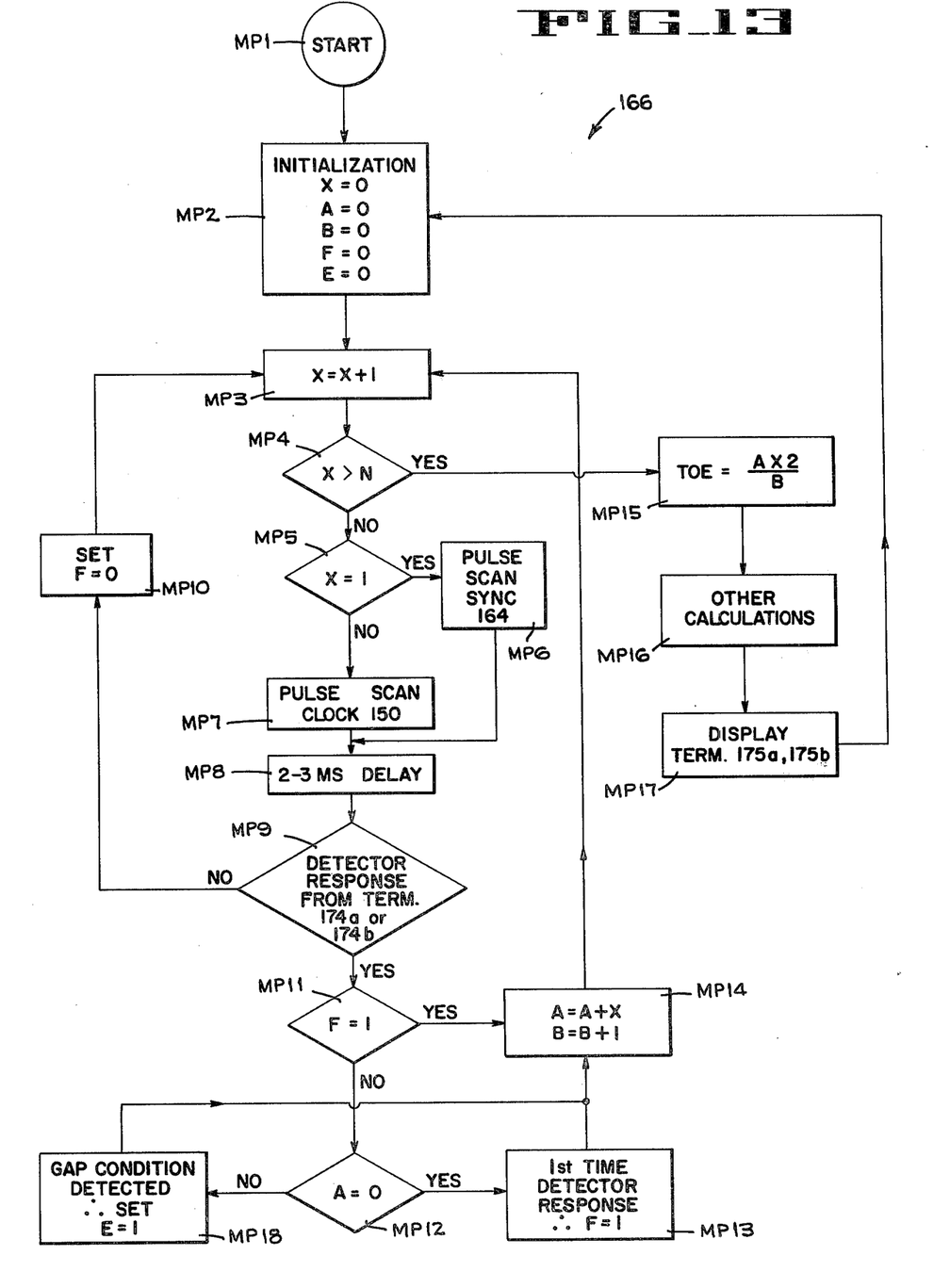
FIG. 13 is a flow chart showing the programming and operation of the microprocessor of FIG. 12.

The programming and operation of the microprocessor 166 will best be understood from the flow chart shown in FIG. 13, wherein the diamond boxes represent decision boxes and the rectangular boxes represent instruction boxes. The chart of FIG. 13 represents the operation of the projector on one wheel and the detector on the other wheel. Although not shown, the microprocessor 166 also controls the operation of the projector on said other wheel and the detector on said one wheel in a similar manner.

The microprocessor will self start, as indicated at MP1, when the power is turned on. Initially, as indicated at MP2, the values of X, A, B, F and E are zero where:

X = a value (from 1 to 35) representing the particular light source which is energized,
A = sum of the values of X (e.g., 15+16+17=48) representing light sources that produce a response from the detector 108,
B = the number of different light sources X (e.g., 3) that produce a response from the detector,
F = flag resister to keep track of detector responses where 0 indicates no response and 1 indicates a previous response, and
E = error flag register to keep track of gap condition, where E=0 indicates no gap and E=1 indicates a gap condition detected.

During each scan, the light sources 90a to 90n are given values 1 to n (or 1 to 35 in the embodiment illustrated). The first light source which is to be energized (90a) is indicated by a value 1 at MP3 (since the previous value of X was zero). Since, as indicated at MP4, this value is not greater than N (which is equal to 35, the number of light sources), and is equal to 1 (MP5), the terminal 164 (MP6) FIGS. 11, 12 is energized to energize the first light source. After a 2 to 3 microsecond delay (MP8), a return is made to box MP3 if no energy beam impinges the detector 108 (MP9). Prior to return to MP3, the flag register F is set to zero (MP10) if it is not already at zero.

At MP3, the value of X is increased by one, and the operations represented by boxes MP4, MP5, MP7, MP8, MP9 and MP10 are repeated, assuming there is no detector response. It will be noted that since X is not equal to 1 on the loop, terminal 164 (MP6) is not energized, although terminal 150 (MP7) is. This pattern of operations is repeated (the value of X increasing by 1 on each loop) until a particular light source (say, light source represented by X=15) energizes the detector.

At this time F does not equal 1 (MP11) and A=0 (MP12) so F is set to equal 1 (MP13). Thereafter (MP14), the value of A (which is the sum of the values of X representing light sources impinging the detector 108, is increased from zero to 15, and B (which is the number of light sources impinging the detector) is increased from 0 to 1.

Thereafter, a return to box MP3 increases the value of X to 16, and the steps MP4 to MP11 (excluding MP6 and MP10) are repeated, assuming that light source 16 impinges detector 108. This time, however, F=1 (MP11) and the values of A and B are increased, respectively, to 31 and 2 (MP14).

Again, a return to MP3 increases the value of X to 17, and, if light source 17 also impinges the detector, the steps MP4 to MP11 (excluding MP6 and MP10) are repeated. Again, the values of A and B are increased, this time to 48 and 3, respectively.

If we assume that no other light source impinges the detector 108, the steps MP3 to MP9 (excluding MP6) are repeated and, at MP10, F is reset to zero. Thereafter, this loop (MP3, MP4, MP5, MP7, MP8, MP9, MP10 to MP3) is repeated until the value of X is increased at MP3 to 36, which is one greater than the number N of light sources. At that time a number TOE is calculated (MP15) representing the toe of the vehicle wheel.

It should be noted that if two light sources, and only two light sources, energize the detector (say, sources 15 and 16), an imaginary light source between the two sources 15 and 16 would indicate the true toe of the wheel. The A value, in such an example, would be 15+16=31 and the B value 2. If A were divided by B (31/2) the result would be 15½, a value which would represent a point midway between light source 15 and light source 16. However, in the step represented by MP15, the value of A is multiplied by 2 so that the quotient of A divided by B will always be a whole number, but will still be able to indicate points between light sources.

After a quotient is calculated (MP15), any other calculations which it is desired to coordinate with the calculation of TOE are performed (MP16). This might include run out compensation, scaling, cross toe compensation, track toe compensation, front-rear mode compensation, or other calculations which would produce factors to modify the toe angle arrived at by the angle measuring apparatus of the present invention disclosed above. Thereafter, the result of the TOE and other calculations is displayed (MP17) and the values of X, A, B, F and E are reset to zero (MP2).

Another function performed by the microprocessor is the detection of a gap, due to malfunction, in the energization of the light sources. If, for example, light sources 15 and 17 energized the detector 108, it is evident that light source 16 should have if it were operating properly. It will be noted that energization of light source 15 (if it is the first light source to strike detector 108, as indicated in MP11) will set F=1 (MP13). If light source 16 is defective, it will not strike the detector (MP9) but, instead, will set F=0 (MP10). Thereafter, if light source 17 strikes the detector (MP9), if F is not equal to 1 (MP11), and if A is not equal to zero (MP12), E will be set at 1 (MP18). When E=1, the display (when energized at the end of the scan of light sources 1 to 35) will indicate error by an appropriate light signal.

It will be apparent to those skilled in the art that the angle measuring apparatus of the present invention is not limited in its application to cross-toe wheel alignment systems such as that shown in FIG. 3. The wheel alignment system of the present invention is also applicable to cross-toe alignment systems wherein both the projector and the detector are located on the same wheel of the vehicle and wherein a reflecting mirror is placed on the opposite wheel. Although physically mounted together the projector and detector are optically spaced apart a distance equal to the travel of a light beam from the projector to the detector. Also, the wheel alignment system of the present invention is applicable to other wheel alignment systems wherein either:

(1) the projector and detector are placed on a wheel of the vehicle in a plane generally parallel to such wheel, and a cooperating reflecting mirror is located off the vehicle, or (2) the projector and detector are placed off the wheel of the vehicle, and the cooperating reflecting mirror is placed on the wheel of the vehicle in a plane generally parallel to such wheel. It will thus be recognized that when the term "projector" is used in the accompanying claims this could refer to the LED sources or to a mirror which merely reflects (i.e., "projects") the beams in the diverging pattern from sources physically located elsewhere.

In the method of the preferred form of the present invention, a projector is mounted on the wheel of a vehicle. A detector is mounted in spaced relation to the projector. A plurality of energy beams, which may, for example be light beams, are projected from the projector toward the detector, one at a time, in a diverging pattern. The angle between the beam which strikes the detector and the beam which would strike the detector if the wheel were at zero toe is the angle of toe of the wheel.

In the operation of the present invention as a device to measure wheel toe angle, a plurality of light sources which cast beams in a diverging pattern are mounted on the vehicle wheel, the toe of which is to be measured. The detector may be fixed in space or mounted on the projector of the opposite wheel. In each instance, it must be known which light source will strike the detector when the wheel is at zero toe (or which light source will strike the detector at some other reference toe angle). This information can be determined from use of the device on a wheel of known zero toe. In each instance, the angle of toe will equal the angle between the beam which strikes the detector and the reference beam (that is, the beam which strikes the detector at zero toe).

In the preferred form of the invention, the LED array is energized in continuous cycles (each LED being energized once in each cycle) so that the source of the beam which strikes the detector repetitively signals the current toe angle of the wheel.

As the operator adjusts the toe of the wheel to the desired value, the panel lights will record the change and show the operator the instantaneous toe value to guide him in reaching the desired value. More specifically, in the operation of the device of FIG. 3, the steering wheel 60 is held in a centered position to point the wheels straight ahead. The toe of each wheel is recorded on a separate display unit 184L, 184R, and the operator adjusts the turnbuckles 62S and 62R to obtain the desired toe angles.

There has been provided by the present invention an improved method and apparatus for measuring the angle between two members. This apparatus and method can be used for aligning different types of members such as structural members or machinery members. The apparatus is most effective in measuring the angle between the members at the point energy beams are projected from one of the members and at the point the energy beams are received at the other member. In many applications, the value for the angle between the members determined by the apparatus of the present invention can be used as an accurate, or as a close approximation of, value of the angle between the members at other points. In other instances, the actual values sought may depend on other factors which must be given recognition in arriving at an ultimate value desired. If other apparatus and calculations are required, as illustrated by box MP16 in FIG. 13, the values determined by the apparatus of the present invention will be modified or corrected by values determined by said other apparatus.

Although the best mode contemplated for carrying out the present invention has been herein shown and described, it will be apparent that modification and variation may be made without departing from what is regarded to be the subject matter of the invention.

What is claimed is:

1. Angle measuring apparatus to determine the angle between reference axes on two members comprising a plurality of energy sources mounted on one of said members in fixed relation to the reference axis of said one member to cast beams in a predetermined diverging pattern from a defined plane toward the other member, a detector mounted on said other member in a predetermined position thereon relative to said reference axis thereof, the relative widths of the beams at the detector and the spacing thereof being such that at least two beams will strike the detector in a given position of the two members within the measuring range of the apparatus, and means to energize said sources sequentially until the beams from at least two of said sources strike said detector.

2. Angle measuring apparatus to determine the angle between reference axes on two members comprising a plurality of energy sources mounted on one of said members in fixed relation to the reference axis of said one member to cast beams in a predetermined diverging pattern from a defined plane toward the other member, a detector mounted on said other member in a predetermined position thereon relative to said reference axis thereof, the relative widths of the beams at the detector and the spacing thereof being such that at least two beams will strike the detector in a given position of the two members within the measuring range of the apparatus, means to energize said sources sequentially, and means to determine which beams strike the detector to establish the angle between said members.

3. Angle measuring apparatus to determine the angle between reference axes on two members comprising a plurality of light sources mounted on one of said members in fixed relation to the reference axis of said one member to cast beams in a predetermined diverging pattern from a defined plane toward the other member, each of said beams being directed at a unique angle to the reference axis of said one member, a detector mounted on said other member in a predetermined position thereon relative to said reference axis thereof and lying in a plane extending perpendicularly to said axis on said one member when the axes of said two members are parallel and in a predetermined angular relation, the relative widths of the beams at the detector and the spacing thereof being such that at least two beams will strike the detector in a given position of the two members within the measuring range of the apparatus, means to energize said lights sequentially, and means to determine which beams strike the detector to establish the angle between the center of the detector-striking beams and the plane extending perpendicularly to said axis of said one member to give the angle of said members from said predetermined angular relation.

4. The apparatus of claim 3 in which said plurality of light sources pass through a lens for projection at different angles to said other member.

5. The apparatus of claim 3 in which said plurality of light sources is an array of light-emitting diodes.

6. In a measuring device including a member mountable to a wheel of a vehicle for angular orientation in accordance with the orientation of the plane of the wheel, angle measuring apparatus comprising a plurality of light sources in said member each operable when energized to project a light beam from said member, said beams projected in a diverging pattern, a photosensitive detector operable to generate a signal when struck by any one of said beams, the relative widths of the beams at the detector and the spacing thereof being such that at least two beams will strike the detector in a given position of the wheel within the measuring range of the apparatus, and means to identify which of said diverging beams strikes said detector when the member is mounted to the wheel of a vehicle for indicating the toe of said wheel.

7. In a toe measuring device including a projector mountable to a wheel of a vehicle for angular orientation in accordance with the orientation of the plane of the wheel, angle measuring apparatus comprising a plurality of light sources in said projector each operable when energized to project a light beam from said projector, said beams projected in a diverging pattern and each of said beams making a unique predetermined angle with a reference line extending from said projector in fixed relation thereto, a photosensitive detector operable to generate a signal when struck by any one of said beams, the relative widths of the beams at the detector and the spacing thereof being such that at least two beams will strike the detector in a given position of the wheel within the measuring range of the apparatus, and means to identify which of said diverging beams strikes said detector when the projector is mounted to the wheel of a vehicle for indicating the toe of said wheel from the known angle between the detector-striking beams and the reference line.

8. In a toe measuring device including a projector mountable to a wheel of a vehicle for angular orientation in accordance with the orientation of the plane of the wheel, angle measuring apparatus comprising a photosensitive detector operable to generate a signal when struck by a light beam, a plurality of light sources in said wheel mountable projector each operable when energized to project a light beam from said projector, said beams projected toward said photosensitive detector in a diverging pattern and each of said beams making a unique predetermined angle with a reference line extending from said wheel-mounted projector in fixed relation thereto, means to energize said beams sequentially when said member is mounted on the wheel of a vehicle, the relative widths of the beams at the detector and the spacing thereof being such that at least two of said beams strike said detector in a given position of the wheel within the measuring range of the device when particular light sources are energized, and means to identify the particular light sources which are energized when the detector is struck to reveal the angle between the detector-striking beam and the reference line.

9. In a toe measuring device including a projector mountable to a wheel of a vehicle for angular orientation in accordance with the orientation of the plane of the wheel, angle measuring apparatus comprising a photosensitive detector operable to generate a signal when struck by a light beam, a plurality of light sources in said wheel-mountable projector each operable when energized to project a light beam from said projector, said beams projected toward said photosensitive detector in a diverging pattern and each of said beams making a unique predetermined angle with a reference line extending from said wheel mountable projector in fixed relation thereto, said reference line intersecting said detector when the wheel mountable projector is mounted on a wheel and the wheel has a zero toe, means to energize said beams sequentially and one at a time when said wheel mountable projector is mounted on a wheel of unknown toe, the relative widths of the beams at the detector and the spacing thereof being such that at least two of said beams strike said detector in a given position of the wheel within the measuring range of the device when particular light sources are energized, and a circuit responsive to the energization of a light source and the simultaneous generation of said signal to identify the particular detector-striking light beams and the angle between said beams and the reference line.

10. Apparatus for measuring the toe angle of the wheel of a vehicle, a member mountable to the wheel of the vehicle, a detector optically spaced from said member, a plurality of light sources to project beams from said wheel-mountable member, said beams projected in a diverging pattern toward said detector each at a unique angle to the plane of the wheel, the relative widths of the beams at the detector and the spacing thereof being such that at least two beams will strike the detector in a given position of the wheel within the measuring range of the apparatus, means to energize said light sources sequentially to identify the source of the beams which strike the detector.

11. Apparatus for measuring the toe angle of the wheel of a vehicle, a projector mountable to the wheel of the vehicle, a detector optically spaced from said projector, said detector operable to generate a signal when struck by a beam of light, a plurality of light sources to project beams from said projector, said beams being projected in a diverging pattern toward said detector each at a unique angle to the plane of the wheel, means to energize said light sources sequentially, the relative widths of the beams at the detector and the spacing thereof being such that at least two beams will strike the detector in a given position of the wheel within the measuring range of the apparatus, and means responsive to the simultaneous generation of the signals from the detector and the energization of the source of the beams which strike the detector to identify said source.

12. Apparatus for measuring the toe angle of the wheel of a vehicle, a projector mountable to the wheel of the vehicle, a detector mountable to an opposite wheel of the vehicle, said detector operable to generate a signal when struck by a beam of light, a plurality of light sources to project beams from said projector, said beams being projected in a diverging pattern toward said detector each at a unique angle to the plane of the wheel, the relative widths of the beams at the detector and the spacing thereof being such that at least two of said beams strike said detector at a particular toe angle of the wheel within the measuring range of the apparatus and different beams strike the detector at different toe angles of the wheel, and means to energize said light sources one at a time to identify the particular light beams which strike the detector at the particular toe angle of the wheel.

13. In a toe measuring device including a member mounted for angular orientation according to the toe of a wheel relative to a reference position corresponding to a reference toe, angle measuring apparatus comprising a plurality of sources operable when energized to project respectively energy beams from said member in a predetermined angular relationship, a detector optically spaced from said member operable to generate a signal when struck by any one of said beams, the relative widths of the beams at the detector and the spacing thereof being such that at least two beams will strike the detector in a given position of the wheel within the measuring range of the apparatus, said detector being struck by at least two beams when first sources are energized and the member is at a reference orientation corresponding to said reference toe, and means to energize other of said sources including the different sources of different beams to strike the detector when the member is in a different orientation corresponding to a different toe of the wheel, and means to indicate the angular relationship between said reference toe and said different toe of said wheel in response to the energization of the different beams which strike the detector at said different toe of said wheel by virtue of the predetermined angular relationship between the beams from said first sources and the beams from said different sources.

14. In a toe measuring device including a member mountable to a wheel of a vehicle for angular orientation in accordance with the toe of the wheel relative to a zero toe orientation, and for angular displacement in accordance with a change in the toe of the wheel, angle measuring apparatus comprising, a plurality of light sources including a reference source in said member each operable when energized to project a light beam including a reference beam from said reference source, said sources arranged to project from said member said beams in a diverging pattern and in a predetermined angular relationship, a photosensitive detector optically spaced from said member and operable to generate a signal when struck by any one of said beams, said detector positioned relative to said member to be struck by said reference beam when said reference source is energized and the member is oriented in correspondence with a zero toe orientation of the wheel, the relative widths of the beams at the detector and the spacing thereof being such that at least two beams will strike the detector in a given position of the wheel within the measuring range of the apparatus, means to energize said sources one at a time when the wheel is in an unknown toe position until the detector is struck by the beams of one set of said sources, and means responsive to said signals from the detector and from the energization of said set of sources which projects the detector-striking beams to indicate the toe of the wheel by virtue of the angular relationship between the beam from said reference source and the beams which struck the detector.

15. The method of measuring the toe of a vehicle wheel relative to a zero toe comprising the steps of directing a plurality of energy beams in a diverging pattern toward a detector, fixing said pattern of beams relative to the wheel and fixing the position of the detector so that a particular first beam strikes the detector when the toe of the wheel is in a zero toe position, the relative widths of the beams at the detector and the spacing thereof being such that at least two beams will strike the detector in a given position of the wheel within the measuring range of the energy beams, energizing the energy beams one at a time when the toe of the wheel is to be determined, noting the beams which strike the detector, and noting the angle between said first beam and said beams which strike the detector to get the angle of toe of the vehicle wheel.

16. The method of measuring the toe of a vehicle wheel relative to a zero toe position assumed by the wheel when the wheel is parallel to the central longitudinal axis of the vehicle comprising the steps of mounting a unit in a predetermined fixed angular relation with the wheel, directing a plurality of light beams, including a zero reference beam, in a diverging pattern and in fixed angular relation from said unit and toward a detector, fixing said pattern of beams in said unit so that said zero reference beam strikes the detector when the vehicle wheel is in a zero toe position, mounting said unit on a vehicle wheel of unknown toe, the relative widths of the beams at the detector and the spacing thereof being such that at least two beams will strike the detector in a given position of the wheel within the measuring range of the light beams, energizing the light beams one at a time until the detector is struck, and measuring the angle between the beams which strike the detector and the zero reference beam.

17. The method of measuring the angle between two members comprising the steps of projecting from one of said members toward the other member a plurality of light beams one at a time in a diverging pattern, and determining the light beams which strike a predetermined point on said other member to determine the angle between said members, the relative widths of the beams at said predetermined point and the spacing thereof being such that at least two beams will strike the predetermined point at a given angle between the members within the measuring range of the light beams.

18. The method of measuring the angle between a first member having projecting means thereon and a second member having detecting means thereon comprising the steps of projecting from said first member to said second member a plurality of light beams one at a time in a predetermined diverging pattern, one of said light beams striking the detecting means when said members are in predetermined angular relation, the relative widths of the light beams at said detecting means and the spacing thereof being such that at least two beams will strike the detecting means at a given angle between the first and second members within the measuring range of the light beams, detecting the light beams which strike the detecting means on said second member when said second member is at an unknown angular relation to said first member, and determining said unknown angular relation between said members relative to said predetermined angular relation from the angular relation between said one light beam and the center of the beams striking said detecting means at said unknown angular relation.

* * * * *